H. F. WADHAMS.
Fruit-Gatherer.

No. 63,584.

Patented Apr. 2, 1867.

Witnesses:
Theo. Tusche
J. A. Service

Inventor:
H. F. Wadhams
Per Munn & Co
Attys.

United States Patent Office.

H. F. WADHAMS, OF SOUTH DANSVILLE, NEW YORK.

Letters Patent No. 63,584, dated April 2, 1867.

IMPROVEMENT IN DEVICE FOR GATHERING APPLES.

*The Schedule referred to in these Letters Patent and making part of the same.*

TO ALL WHOM IT MAY CONCERN:

Be it known that I, H. F. WADHAMS, of South Dansville, Steuben county, New York, have invented a new and improved Device for Gathering Apples and other Fruit; and I do hereby declare that the following is a full, clear, and exact description thereof, which will enable others skilled in the art to make and use the same, reference being had to the accompanying drawings, forming a part of this specification.

This invention consists in the application to the body of an apple or other fruit tree of a fruit receiver, constructed of canvas or other suitable cloth, and arranged in such a manner that it will receive the fruit when the tree is shaken, and with as little injury as possible to the falling fruit, thereby avoiding the tedious labor of picking by hand. In the accompanying sheet of drawings—

Figure 1:
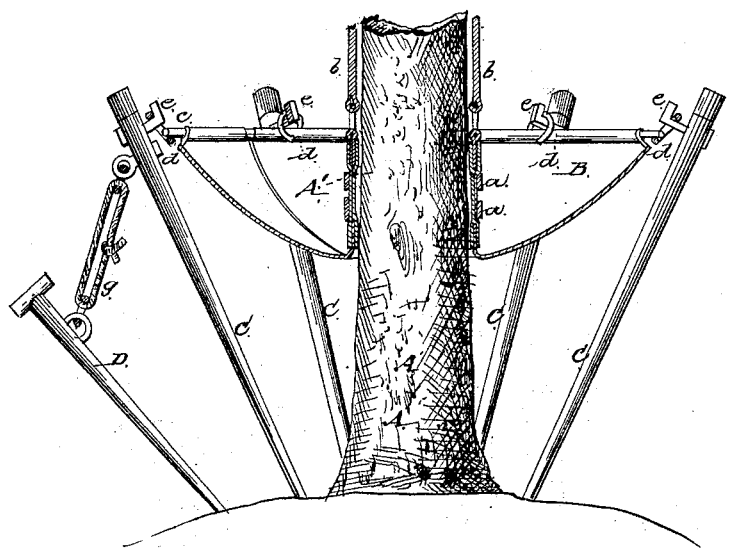
Figure 2:
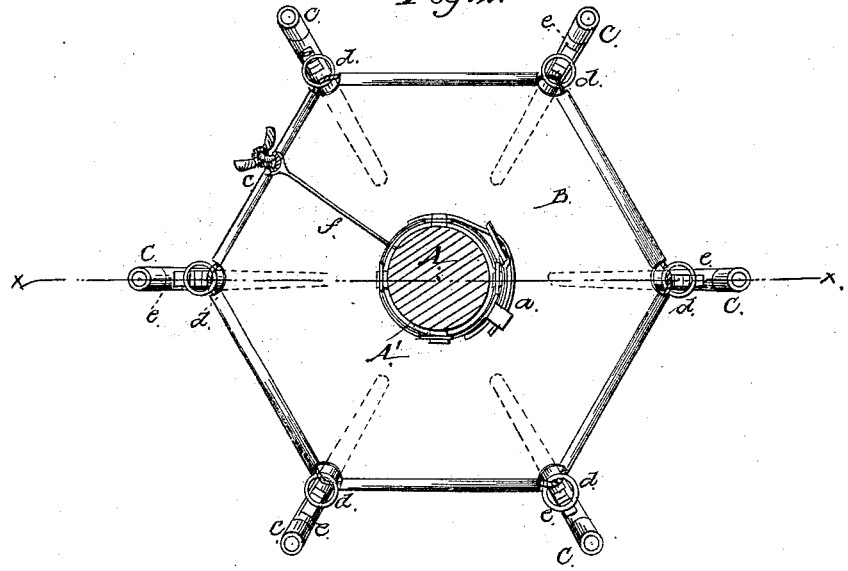

Figure 1 is a side sectional view of my invention, taken in the line $x\,x$, fig. 2.

Figure 2, a plan or top view of the same.

Similar letters of reference indicate corresponding parts.

A represents the body of a fruit tree, and B a piece of canvas or other suitable cloth or fabric, which is cut or made in circular form, having a circular opening at its centre, to which a belt, $A^\times$, of leather or other durable material is attached to secure the central part of B snugly to the body A; straps $a$ and ropes $b$, either or both, being attached to the belt to bind the latter to the tree. The canvas B has a rope, $c$, fitted in a hem around its edge, and rings, $d$, are placed on said rope, and fitted on hooks, $e$, at the upper ends of the stakes C, which are driven in the ground all around the body A of the tree at a suitable distance from it. The canvas B has a radial cut, $f$, made in it, said cut extending from the hole at the centre of the canvas to the outer edge of the same in order to admit of its being applied to the body A; and in order to keep the stakes C firm in position an outer series of stakes, D, are employed, driven in the ground some distance from C, and connected to them by ropes or chains, G. The canvas B should be of such a diameter as to extend outward as far as the branches, so that by shaking the tree the canvas will catch all the fruit; and the canvas should sag a little, as shown in fig. 1, so as to form a receptacle of sufficient depth to hold the fruit shaken down into it.

This device may be constructed at a small cost, and readily applied to the tree and removed from it. The fruit will not be injured at all by dropping upon the canvas, and a tree may have the fruit taken from it very expeditiously.

I claim as new, and desire to secure by Letters Patent—

The canvas B, secured to the body A of the tree through the medium of the belt $A^\times$, straps $a$, and secured or held in position by the stakes C D, all arranged in the manner substantially as and for the purpose set forth.

The above specification of my invention signed by me this      day of January, 1867.

H. F. WADHAMS.

Witnesses:
   ALEX. F. ROBERTS,
   J. M. COVINGTON.